(12) United States Patent
von Puttkamer

(10) Patent No.: US 10,632,546 B2
(45) Date of Patent: Apr. 28, 2020

(54) COUNTERSINKING TOOL, TOOL ARRANGEMENT AND METHOD

(71) Applicant: Guehring KG, Albstadt (DE)

(72) Inventor: Ingo von Puttkamer, Messstetten (DE)

(73) Assignee: Guehring KG, Albstadt (DE)

( * ) Notice: Subject to any disclaimer, the term of this patent is extended or adjusted under 35 U.S.C. 154(b) by 0 days.

(21) Appl. No.: 15/909,082

(22) Filed: Mar. 1, 2018

(65) Prior Publication Data

US 2019/0030624 A1    Jan. 31, 2019

(30) Foreign Application Priority Data

Mar. 1, 2017   (DE) .................. 10 2017 104 199

(51) Int. Cl.
*B23B 51/10*   (2006.01)
*B23D 77/00*   (2006.01)
*B23B 49/00*   (2006.01)

(52) U.S. Cl.
CPC .......... *B23B 51/10* (2013.01); *B23B 51/107* (2013.01); *B23D 77/00* (2013.01); *B23B 49/00* (2013.01); *B23B 49/005* (2013.01); *B23B 51/104* (2013.01); *B23D 2277/68* (2013.01); *Y10T 408/5586* (2015.01); *Y10T 408/9065* (2015.01)

(58) Field of Classification Search
CPC ....... B23B 51/10; B23B 51/107; B23D 77/00; Y10T 408/5586; Y10T 408/9065
See application file for complete search history.

(56) References Cited

U.S. PATENT DOCUMENTS

| 2,383,854 | A | * | 8/1945 | Gwinn, Jr. ............ | B23B 51/104 |
| | | | | | 408/112 |
| 3,302,495 | A | | 2/1967 | Schmid | |
| 5,487,627 | A | * | 1/1996 | Kasutani ............... | B23B 51/107 |
| | | | | | 408/145 |
| 6,984,094 | B2 | * | 1/2006 | Nuzzi ................... | B23B 51/107 |
| | | | | | 408/224 |
| 9,180,530 | B2 | * | 11/2015 | Gey .......................... | B23C 5/18 |
| 10,213,843 | B2 | * | 2/2019 | Rebholz ................ | B23B 49/005 |
| 2004/0057804 | A1 | | 3/2004 | Jager et al. | |

(Continued)

FOREIGN PATENT DOCUMENTS

| CN | 106141273 A | * 11/2016 |
| DE | 1 477 760 | 10/1969 |

(Continued)

*Primary Examiner* — Eric A. Gates
(74) *Attorney, Agent, or Firm* — Burr & Brown, PLLC

(57) ABSTRACT

A countersinking tool, comprising a tool shank and a tool head with multiple deburring or countersinking edges and an insertion pin. In some embodiments, the insertion pin features at least one reaming edge, on a radially outer side and extends over less than 33% of the overall length of the insertion pin, wherein the reaming edge can be inserted into an unfinished bore with a diameter, smaller than a nominal diameter of the bore, in a cutting fashion, wherein the reaming edge acts as a drill bit and is arranged on the insertion pin at a radius that corresponds to the radius of a nominal diameter of the bore, and wherein the insertion pin has the nominal diameter of the bore and can be guided in the bore without play.

Also, a tool arrangement with a countersinking tool and to a method for producing a countersunk and/or deburred bore.

28 Claims, 7 Drawing Sheets

(56) References Cited

U.S. PATENT DOCUMENTS

| | | | |
|---|---|---|---|
| 2015/0115549 A1 | 4/2015 | Teusch | |
| 2016/0214183 A1* | 7/2016 | Kanaboshi | ........... B23B 31/305 |
| 2017/0274459 A1 | 9/2017 | Rebholz | |

FOREIGN PATENT DOCUMENTS

| | | | | |
|---|---|---|---|---|
| DE | 25 49 153 A1 | | 5/1977 | |
| DE | 101 54 434 B4 | | 2/2007 | |
| DE | 10 2012 209 312 A1 | | 12/2013 | |
| DE | 10 2013 100 130 A1 | | 7/2014 | |
| DE | 10 2013 013 499 B3 | | 12/2014 | |
| DE | 10 2014 115 768 B3 | | 1/2016 | |
| GB | 203866 A | * | 9/1923 | ........... B23B 51/107 |
| JP | 04275814 A | * | 10/1992 | ........... B23B 51/107 |
| SU | 1708544 A1 | * | 1/1992 | ........... B23B 51/107 |
| WO | 02/055244 A1 | | 7/2002 | |

* cited by examiner

A-A

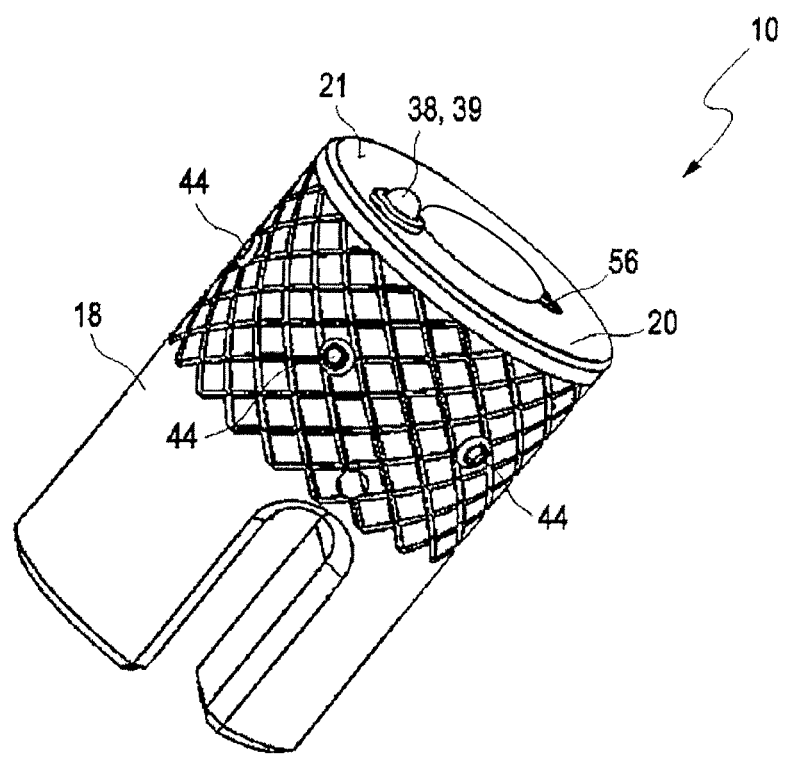
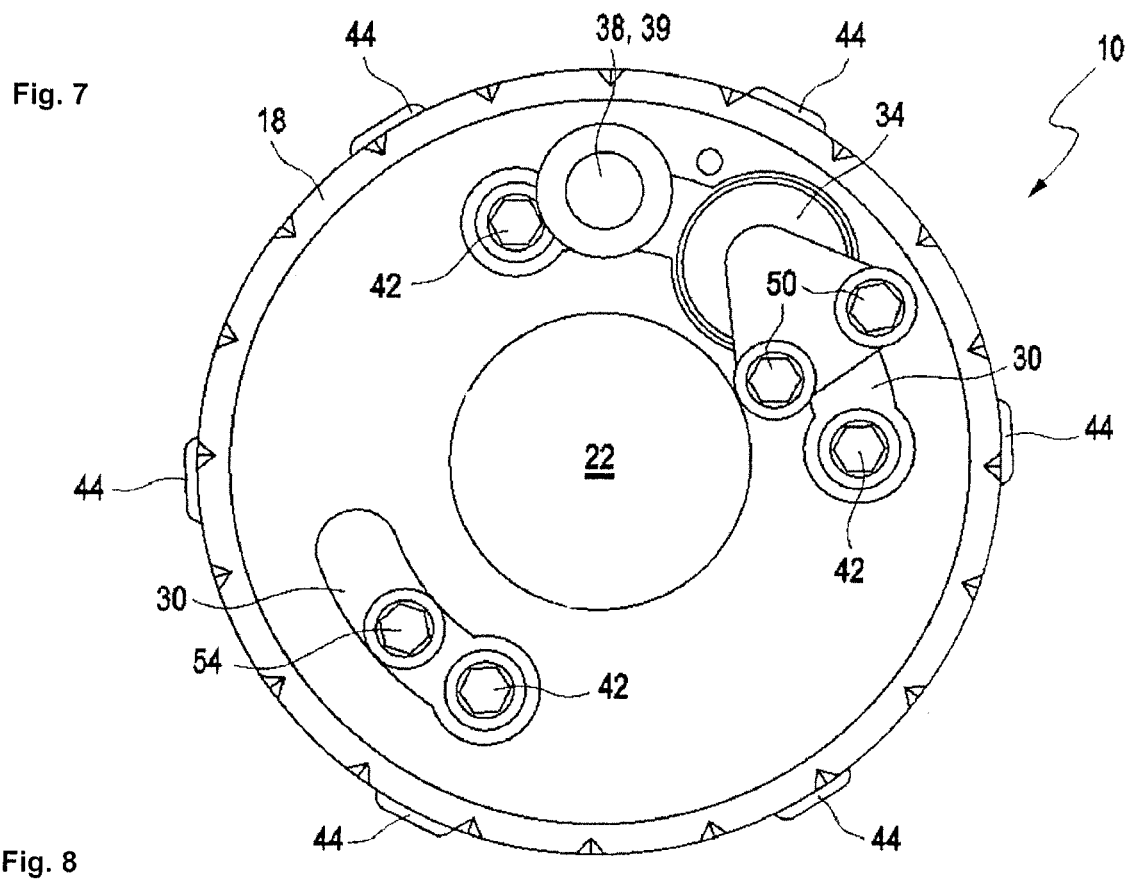
Fig. 7
Fig. 8

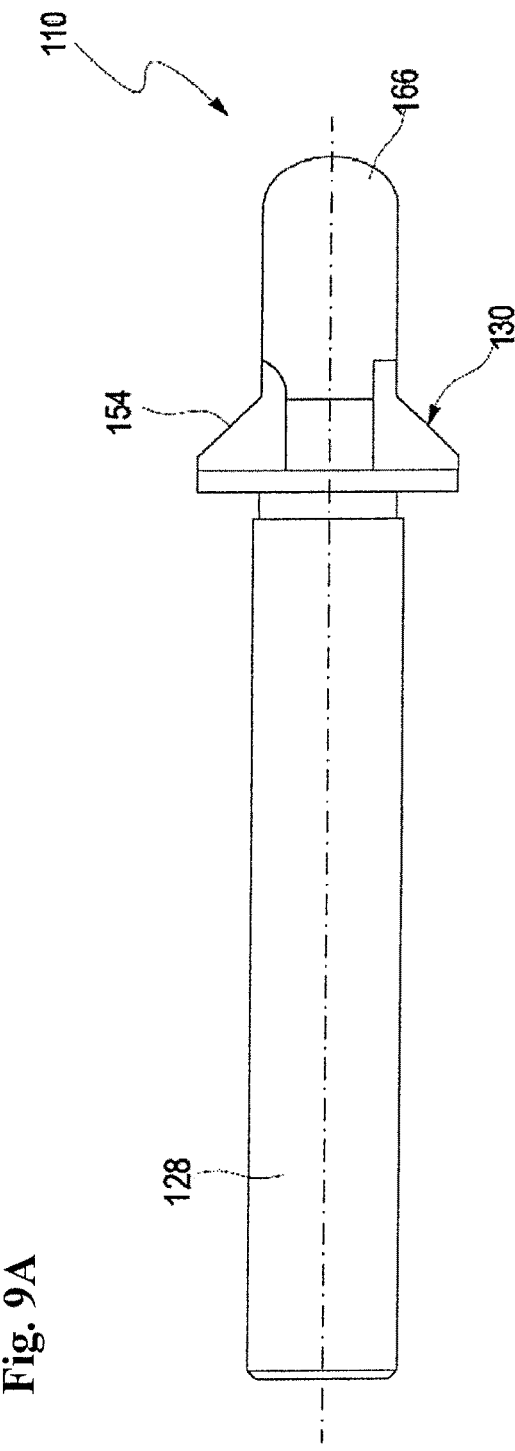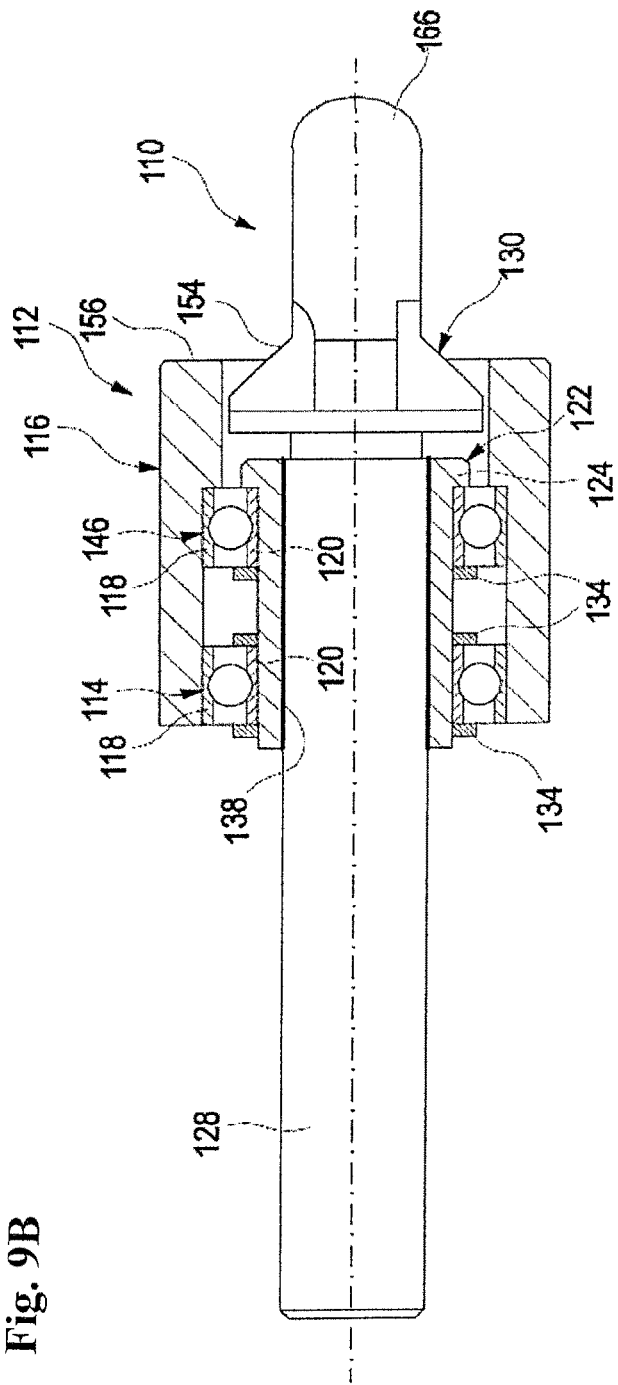
Fig. 9A
Fig. 9B

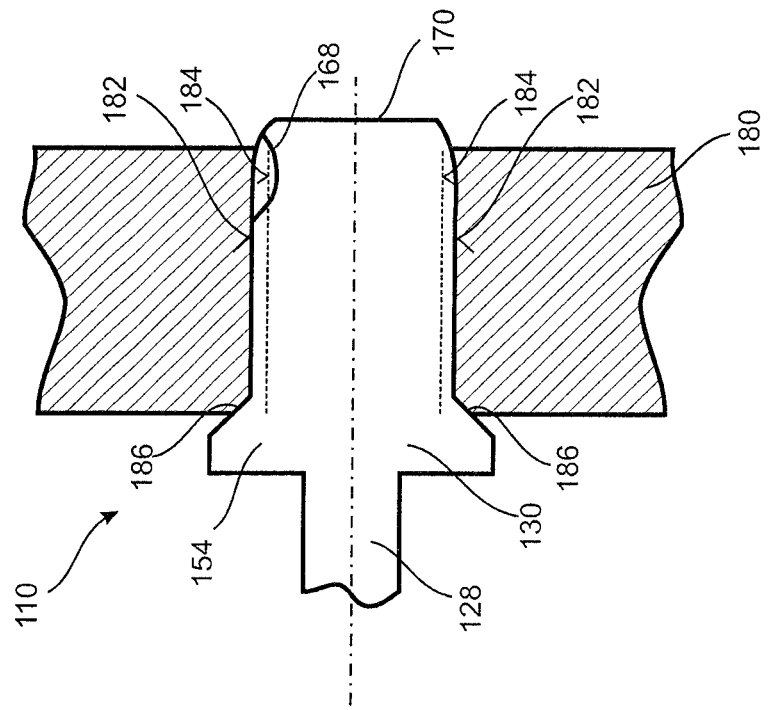
Fig. 10B
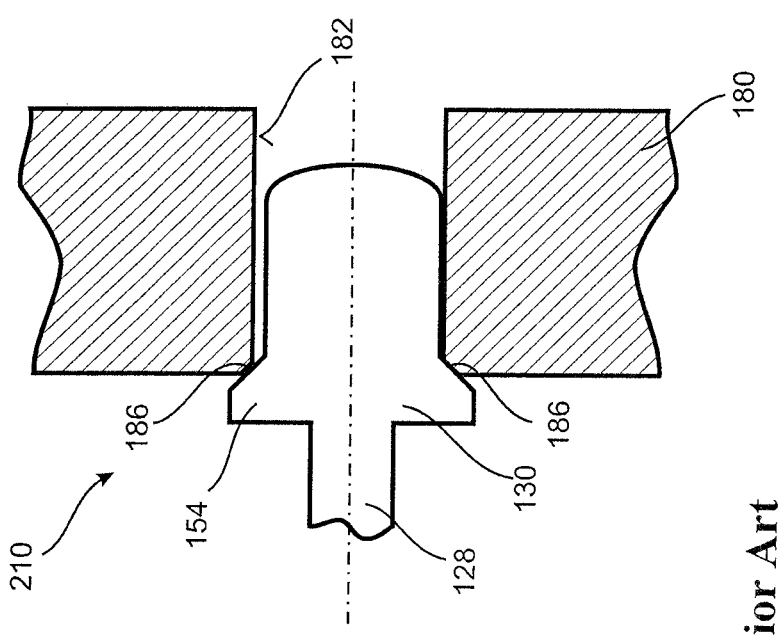
Prior Art  Fig. 10A

COUNTERSINKING TOOL, TOOL ARRANGEMENT AND METHOD

The present invention pertains to a countersinking tool, particularly a conical countersinking tool or plane countersinking tool, which comprises a tool shank and a tool head that features multiple deburring or countersinking edges and an insertion pin.

The invention also pertains to a tool arrangement with such a countersinking tool.

The invention furthermore pertains to a method for producing a countersunk and/or deburred bore with a nominal diameter in a workpiece by utilizing such a rotating countersinking tool or such a tool arrangement.

PRIOR ART

Corresponding countersinking tools are used for countersinking or deburring a bore provided in a workpiece and can be accommodated in a clamping chuck of a machine or a handheld tool with their tool shank. The insertion pin should ensure that the countersinking tool is centered and guided in a bore to be finished. Such countersinking tools may additionally comprise a stop that features a bearing, by means of which a stop sleeve can rotate freely about the countersinking tool such that the stop sleeve can touch down on the surface of a component and the countersinking tool can rotate freely once a predefined penetration depth into the component is reached. Such countersinking tools with a stop are particularly used for countersinking or milling operations in the construction of automobiles and aircraft.

For example, DE 101 54 434 B4 discloses a stop device with a tool shank that comprises a freely rotatable stop sleeve, wherein said stop sleeve can be rotated about a tool shank of the stop device by means of a single rotary bearing. A drilling or milling tool can be inserted into the tool shank of the stop device and locked therein in a rotationally rigid fashion. Similar stop devices are described in DE 10 2013 013 499 B3 and DE 10 2014 115 768 B3.

DE 10 2012 209 312 A1 describes a modular tool holder, as well as a shank tool that is formed by a tool holder, as well as a cutting head held therein and a cutting tool. The cutting tool may be realized in the form of a multi-edged reamer with six cutting edges that are arranged around the rotational axis. On its outer circumference, the cutting head comprises a plurality of indexable or exchangeable inserts. Such a shank tool may represent a precision machining tool, which is realized in the form of a combination die for the complete machining of components, for example cylinder heads.

A bore or countersink with a desired depth can be achieved with the aid of such stops. In this case, the desired alignment of the machining step relative to the component surface can only be conditionally ensured despite the insertion pin.

This results in the problem that the countersink or bore only has the desired depth in a certain circumferential area and cannot be produced at the desired angle, usually perpendicular to the tool surface, during the machining operation. In other areas, the bore or countersink can have a greater or lesser depth because the machining tool cannot be exactly aligned relative to the surface of the workpiece by means of the insertion pin.

WO 2002/055244 A1 describes a drilling/milling tool, in which an axially displaceable holder with countersinking edges is mounted on a drill by means of a clamping shoe.

DE 14 77 760 A discloses a countersinking tool with a centering pin, which is arranged in an axial bore of the tool body such that it can be displaced against the force of a spring and protrudes from the cutting head with a conical extension, wherein the centering pin features on its circumference at least one sector-like recess, which at least partially extends through the region of the conical extension in an at least approximately axial direction, and wherein a cutting edge arranged on the cutting head is guided in said recess in a sliding fashion.

Aligning devices or adjusting devices, which are used as drilling templates or drilling aids and can be directly attached to a tool shank in order to adjust a desired alignment of a rotary tool, are furthermore known from the prior art.

For example, DE 2013 100 130 A1 describes a device that features a tripod with support control for machining operations to be carried out by means of a tool. The support control is realized with one or more sensors that respectively renders or render the measured values of the support or non-support of legs of the tripod. An acoustical or visual signal serves for indicating a measuring result of the sensor.

An exact alignment of rotary machining operations and a defined penetration depth of the countersinking tool are particularly important in the construction of automobiles, ships and aircraft due to the immaculate and streamlined design of workpiece surfaces, in which rivets or screws accommodated in fastening bores should end as flush as possible with the workpiece surface.

The invention is therefore based on the objective of proposing a countersinking tool that can be aligned in an improved fashion.

The above-defined objective is attained with a countersinking tool according to the independent claim. Advantageous embodiments form the objects of the dependent claims.

DISCLOSURE OF THE INVENTION

The invention concern a countersinking tool, which comprises a tool shank and a tool head that features multiple deburring or countersinking edges and an insertion pin.

It is proposed that the insertion pin features at least one reaming edge, which is arranged on a radially outer side and extends over less than 33% of the overall length of the insertion pin, wherein the reaming edge can be inserted into an unfinished bore with a diameter, which is smaller than a nominal diameter of the bore, in a cutting fashion, wherein the reaming edge likewise acts as a drill bit and is arranged on the insertion pin at a radius that essentially corresponds to the radius of a nominal diameter of the bore, and wherein the insertion pin has the nominal diameter of the bore and can be guided in the bore without play. The reaming edge can produce a progressive cut on the wall of a bore to be machined, wherein accumulating chips can be removed in the inserting direction of the countersinking tool. In this case, the reaming edge also acts as a drill bit and is not only designed for finishing an already produced bore, which already exists with a nominal diameter, in a reaming fashion. The bore to be machined is exactly widened to the diameter of the insertion pin by the reaming edge. In a manner of speaking, the insertion pin cuts the required diameter of the bore to be countersunk itself. Consequently, an unfinished bore to be machined has a smaller diameter than a bore, which was already machined with the inventive countersinking tool. In this context, the unfinished bore may amount, for example, to at least 80%, preferably at least 90%, of the maximum diameter of the insertion pin. The diameter of the unfinished bore may likewise amount to no more than 99%, preferably no more than 97.5%, particularly no more than 95%, of the maximum diameter of the insertion pin. The reaming edge is in this case preferably arranged in such a way that a bore with a diameter corresponding to the diameter of the insertion pin is produced. This minimizes the play between the insertion pin and the workpiece such that the countersink or the bevel is produced in a much more precise and exactly rotationally symmetrical fashion because the insertion pin acts as a guide for the countersinking tool. Angular deviations between the axis of symmetry of the countersink or bevel and the axis of symmetry of the bore can thereby be prevented.

The insertion pin preferably has a diameter that corresponds to the nominal diameter of the bore over the entire length behind the reaming edge, i.e. in the entire area that is arranged in the direction of the clamping section or tool shank referred to the reaming edge. In this region, the insertion pin particularly has the nominal diameter, which directly borders on the countersinking edges. It can therefore be ensured that the countersinking tool can be guided in the bore in a centered fashion.

The insertion pin preferably has a length that is longer than the depth of a bore or through-bore to be machined. In this way, it can be ensured that the entire bore is realized with a constant diameter because the reaming edge on the insertion pin widens the bore to the nominal diameter over its entire length. It is likewise conceivable to produce a bore or blind bore that has two different diameters over its length. This can be realized, for example, by means of a countersinking tool with an insertion pin, in which the insertion pin has a length that is shorter than the depth of the bore to be countersunk.

The reaming edge extends over less than 33% of the overall length of the insertion pin. The length of the reaming edge may lie, for example, in the range between 5% and 33% of the overall length of the insertion pin, particularly between 10% and 30%, preferably at approximately 25%, of the overall length of the insertion pin.

It is advantageous if the reaming edge is arranged in the front region of the insertion pin, i.e. arranged on the insertion pin in the direction of the tool tip. No reaming edge is preferably arranged on the face of the insertion pin. The cutting edge of the reaming edge is preferably arranged on the circumferential side of the insertion pin, wherein the chip removal takes place in the direction of the front end of the insertion pin, i.e. in the direction of the tool tip. Due to this type of chip removal, it can furthermore be ensured that the rotational axis of the countersinking tool and the rotational axis of the bore coincide because no interfering chips remain in the bore. The bore is therefore preferably realized in the form of a through-bore.

The countersinking tool may feature only one such reaming edge. However, a plurality of reaming edges, for example two to eight reaming edges, may also be equidistantly distributed over the circumference of the insertion pin.

In a preferred embodiment, the reaming edge may be arranged in a front region of the insertion pin and/or additional deburring edges, which effect precision machining of a bore to be machined, are arranged on the insertion pin in an offset position in the direction of the tool shank. The reaming edge is preferably arranged at a location that initially comes in contact with the circumference of an unfinished bore during the insertion of the insertion pin into the unfinished bore. The reaming edge is therefore arranged, for example, on the circumferential side of the insertion pin that lies closest to the tool tip. If additional deburring edges are arranged on the insertion pin, they are arranged offset relative to the reaming edge in the direction of the clamping section of the tool. The number of deburring edges preferably corresponds to the number of reaming edges. If multiple reaming edges and multiple deburring edges exist, a reaming edge and a deburring edge may be respectively arranged on the tool head on a line extending parallel to the axis of symmetry of the countersinking tool. If the countersinking tool features at least one reaming edge and at least one deburring edge, the reaming edge serves for widening the unfinished bore to a nominal diameter of the desired bore and the deburring edge serves for deburring the inner surface of the bore, which already has the nominal diameter. In this case, all chips produced are preferably removed in the direction of the tool tip.

In a preferred embodiment, the insertion pin may be tapered in the direction of its face. This simplifies the insertion into the bore to be machined. The reaming edge is preferably arranged in the transition area between the tapered and non-tapered insertion pin such that the bore can be widened to the nominal diameter by the reaming edge. The reaming edge is at least arranged in the region of the non-tapered insertion pin. The face of the insertion pin may furthermore be realized flat, wherein no reaming edge or no region of a reaming edge is respectively arranged at this location.

In a preferred embodiment, the insertion pin may be tapered in the direction of its face in a first section, particularly in the section, over which the reaming edge extends, and realized cylindrically in a second section that lies between the first section and the tool head. During the insertion of the countersinking tool into the bore to be machined, the first section with the reaming edge is initially introduced into the bore. As the insertion depth increases, the reaming edge comes in contact with the wall of the bore and removes material therefrom until the bore has reached its nominal diameter, which is defined by the radially outermost section of the reaming edge. As the insertion depth increases further, the cylindrical section of the insertion pin is initially introduced into the bore and then guides the countersinking tool therein until the tool head with its deburring or countersinking edges ultimately comes in contact with the workpiece. The cutting edges of the reaming edge preferably do not or not significantly protrude over the diameter of the cylindrical section. In a preferred embodiment, the radius of the insertion pin in the second, cylindrical section may be identical to the radius of the insertion pin in a point that is defined by a radially outermost section of the reaming edge. In this way, the play of the cylindrical section of the insertion pin in the widened bore is additional minimized. In this case, the diameter of the cylindrical section of the insertion pin corresponds to the nominal diameter of the bore to be machined such that the cylindrical section of the insertion pin can be inserted into the bore without almost any play. The cutting edges of the reaming edge therefore do not or not significantly protrude over the diameter of the cylindrical section.

In a preferred embodiment, the insertion pin may in a longitudinal section through the countersinking tool be tapered along a curvature line, the curvature of which increases as the distance from the face of the insertion pin decreases. The insertion pin, particularly the first section featuring the reaming edge, therefore has the shape of a paraboloid (which, if applicable, is cut off on its face). In this case, the reaming edge may be at least partially arranged in this first section and also extend in a cylindrical section of the insertion pin.

In a preferred embodiment, the reaming edge may be spaced apart from the face of the insertion pin in the axial direction, wherein particularly the face of the insertion pin is flat. Consequently, a section without reaming edge exists on the tip of the insertion pin and simplifies the insertion of the countersinking tool into the bore, effects an initial rough centering and, in particular, reduces the risk of the reaming edge catching or jamming during its insertion into the bore. In this case, the first section, which is realized without reaming edge, may have the diameter of the unfinished bore. Consequently, this first section may have a diameter that is smaller than the diameter of the insertion pin.

The invention furthermore concerns a tool arrangement with an inventive countersinking tool, particularly according to one of the above-described embodiments, and a stop that is mounted on the tool shank of the countersinking tool, wherein the stop features a stop sleeve, which is coupled to a sliding or rolling bearing such that it is freely rotatable about the tool.

In a preferred embodiment, a first bearing bush of the bearing may carry the stop sleeve and a second bearing bush of the bearing may be seated on a shank sleeve in a rotationally rigid fashion, wherein the shank sleeve may be mounted on a threadless section of the tool shank of the tool. The shank sleeve couples the stop sleeve to the tool shank of the countersinking tool by means of a rotary bearing. In this case, the tool shank is realized in a threadless fashion, i.e. it is typically realized smooth and without a thread section. In this way, the tool shank is not radially widened relative to the nominal shank diameter. The shank sleeve may be mounted on an axial position of the tool shank in a rotationally rigid fashion. The position of the shank sleeve on the tool shank and the position of the stop sleeve on the bearing bush define the penetration depth of the tool, at which the stop sleeve touches down on a surface of the workpiece to be machined. Once a thusly defined penetration depth is reached, a stop ring on the face of the stop sleeve is seated on the workpiece surface while the tool in the interior rotates freely with the shank sleeve such that the stop sleeve can rest on the component surface due to its coupling to the adjusting ring by means of the sliding or rolling bearing.

The shank of the tool can be directly clamped into a clamping chuck of a rotary machine or a drilling machine such that optimal concentricity is ensured. The angle of attachment of the tool can be optimally chosen, wherein the stop sleeve does not produce a direct connection between the tool head and the driving drilling tool, but rather merely touches down on the drill shank of the tool. The depth stop is defined by the position of the shank sleeve on the drill shank, as well as the axial position of the freely rotatable stop sleeve relative to the shank sleeve.

In a preferred embodiment, the stop may be clamped, screwed or bonded on the tool shank of the countersinking tool.

In a preferred embodiment, a tool aligning device for aligning a countersink to be produced or for aligning a finishing step relative to a normal of the surface of a workpiece to be machined may be arranged on the stop, wherein the tool aligning device may comprise a base body, as well as a through-hole and at least one signaling device, which is activated upon mechanical contact between the tool aligning device and the surface of the workpiece and outputs at least one alignment signal during the alignment in an aligning direction, and wherein the stop is accommodated in the base body.

In other words, the invention proposes an aligning device or adjusting device in the form of a countersinking aid, which activates a signaling device due to mechanical contact with the surface of a workpiece in order to thereby indicate that the tool is in the desired machining position, i.e. aligning direction. The aligning direction may typically be an angle of 90° relative to the workpiece surface, but may also be a freely selectable angle and direction of inclination relative to the workpiece surface. The tool aligning device is arranged on a tool with a stop. To this end, the stop of the tool is accommodated and supported in the base body of the tool aligning device and the tool including its stop is thereby held in the tool aligning device. In this way, the countersinking tool can be aligned. This makes it possible to ensure a precise penetration depth by means of the stop on the one hand, which is particularly important with respect to countersinks, and to observe a defined machining angle on the other hand.

The tool aligning device may be advantageously realized in the form of a tripod, in which the stop can be accommodated.

Such an aligning device allows a predefined adjustment of a working position, preferably in a direction extending orthogonal to a tangent on the surface of the workpiece, i.e. in the direction of a normal of the workpiece surface. It furthermore allows a defined alignment of the countersinking tool on plane and curved surfaces. The base body of the tool aligning device is preferably realized with a greater longitudinal dimension than the stop referred to the rotational axis. In this case, the tool aligning device may have at least twice the length of the stop, preferably at least three-times the length of the stop, referred to the rotational axis. The entire stop may be circumferentially enclosed by the base body. The base body preferably has a partially circular or circular shape at least over part of its length. A partially circular shape has the advantage that the entire tool aligning device can be moved close to a wall, which extends parallel to the rotational axis of the tool, with at least one side. In this way, a bore or countersink can be produced in the workpiece close to such a perpendicular wall or started on the wall in order to specify a defined aligning direction.

Due to the combination of the inventive countersinking tool and the above-described tool aligning device into a tool arrangement, countersinks and/or bevels can be produced with particularly high precision.

In a preferred embodiment, the base body may comprise a guiding device that produces a connection between the stop sleeve of the stop and the tool aligning device such that the stop can be aligned in the aligning direction. The guiding device serves for allowing or preventing a relative motion between an installed stop and the tool aligning device. The guiding device preferably prevents a relative rotational motion between the stop and the tool aligning device and allows a longitudinal displacement in the axial direction. The guiding device is preferably arranged on the inner surface of the base body of the tool aligning device along a limited circumferential area. In this context, the guiding device may also be partially integrated into the base body. The guidance preferably takes place mechanically. It would furthermore be conceivable that a stop forms part of the tool aligning device and/or is adapted to the geometry of the tool aligning device. Consequently, a clamping tool can be inserted and fixed in the stop, which forms part of the aligning device, for an operation.

In a preferred embodiment, the stop may be connected to the tool aligning device in a rotationally rigid fashion. A rotationally rigid connection can be produced by means of the guiding device, wherein the stop, as well as the tool aligning device, is not set in rotation, i.e. rotationally rigid, during the operation of an installed tool with stop. In this case, an intact surface area on the workpiece surface can be preserved and achieved in the region of the bore and/or countersink because no tangential relative motion between the stop and the workpiece surface can occur.

In a preferred embodiment, the stop may be guided in the tool aligning device in a longitudinally displaceable fashion, particularly by means of the guiding device, wherein the stop in the base body can be longitudinally/axially displaced in the direction of the workpiece. Referred to the longitudinal axis of the tool aligning device, the stop preferably has a shorter length than the base body of the tool aligning device. Alternatively, a stop can also be pulled out over an upper face of the aligning device such that a reduced structural height of the aligning device can be achieved. The installed stop can therefore be displaced in the axial/longitudinal direction within the base body. The stop can be at least displaced in the longitudinal direction to such an extent that the lower edge of the stop and the lower edge of the tool aligning device lie at the same height. In a lowered position of the stop, this stop and the lower edge of the tool aligning device are in contact with the surface of the workpiece. The stop makes it possible to define the depth of the bore and/or countersink to be produced whereas the tool aligning device defines the alignment of the bore and/or countersink and maintains this alignment in a desired position.

In a preferred embodiment, the guiding device may comprise a pin, a web and/or a groove, wherein the web and/or the groove preferably extend in the longitudinal direction, particularly parallel to the longitudinal axis of the tool aligning device, and accordingly can be longitudinally/axially guided in a groove or a pin or web of the stop sleeve such that a rotationally rigid connection between the tool aligning device and the stop, as well as an axial displaceability of the stop in the tool aligning device, is achieved. In this case, the pin or the web is guided in the groove in such a way that the stop can be connected to the tool aligning device in a rotationally rigid fashion. The groove may be arranged along an inner surface of the base body of the tool aligning device or in the outer surface of the stop. Accordingly, the pin or the web can also be arranged on the stop or on the base body such that at least one pin or web can respectively engage into at least one groove arranged on the other element in order to realize the guiding device. In this case, the width of the groove approximately corresponds to the width of the pin or the web such that a rotationally rigid connection can be produced. In a preferred embodiment, the guiding device may comprise at least two or preferably three such web-groove or pin-groove connections in the circumferential direction of the tool aligning device.

In a preferred embodiment, the web or the groove may extend over the entire axial length of the tool aligning device or the stop, wherein the stop can thereby be displaced in such a way that an underside of the stop comes in mechanical contact with the surface of the workpiece. The tool aligning device is preferably realized longer than the stop referred to the longitudinal axis such that the web or the groove can preferably extend over the entire length of the tool aligning device. This ensures that the stop can be displaced up to or even beyond the lower edge of the tool aligning device and come in contact with a workpiece in order to define the depth of the countersink or bore. The groove and the web may linearly extend parallel to the longitudinal axis of the tool aligning device, as well as in a curved or angled fashion. In this context, the groove and the web may also form a spiral shape along the inner surface of the base body of the tool aligning device in order to carry out a mandatory rotational motion during the downward displacement and, for example, to thereby accommodate or avoid parts protruding from the workpiece surface.

In a preferred embodiment, the tool aligning device may comprise at least two or, in particular, at least three mechanical or electrical sensing elements for being supported on the surface of the workpiece, wherein the sensing elements preferably are equidistantly distributed over the circumference of the face of the base body on the workpiece side. In an embodiment with three sensing elements, the workpiece aligning device may be realized in the form of a tripod of sorts. Due to the design in the form of separate sensing elements rather than an extensive support surface, the area around the location on the workpiece surface to be machined can remain clear such that the removal of chips or coolant is improved. The data may furthermore be transmitted to a computer for quality control purposes. Since the signaling device is activated by the mechanical contact of the sensing elements with a surface, it is not necessary to utilize any transducers or other position measuring devices. This makes it possible to provide a cost-efficient aligning device, which can also be easily manufactured and used without electrical energy. If the bore or countersink should only be aligned in one direction, the tool aligning device may be realized with only two sensing elements. The design with three or more sensing elements is advantageous for an alignment in two directions in space. The third direction in space, i.e. the height, at which the tool is attached, is defined by the clear machining height above the surface of the workpiece and the depth of the machining section. It is likewise possible to use more than three sensing elements. Angular deviations from the normal and therefore predefined angles of inclination can also be adjusted for the machining operation by varying the length of the sensing elements or adjusting the contact point of the sensing element, i.e. the relative switching point, at which an electrical switch is closed once the sensing elements touch down and retract into the base body.

In a preferred embodiment, the axial sensing position of the sensing elements may be adjustable in order to adjust the aligning direction. In this way, countersinks and/or bores not only can be aligned orthogonal to a workpiece surface, but also at a desired angle other than 90°. The alignment may be realized at arbitrary angles relative to the workpiece surface by varying the length of at least one sensing element relative to the remaining sensing elements. Furthermore, an orthogonal alignment of the bore and/or countersink referred to the vertical line can be realized on an inclined workpiece surface.

In a preferred embodiment, an alignment motion of the tool aligning device relative to the normal of the workpiece surface makes it possible for all sensing elements to close an electric circuit between an electrical power source contained in the base body and the signaling device by means of a series circuit activated by the sensing elements in order to thereby activate the individual signaling device. An electric circuit is closed by means of the series circuit due to the mechanical contact of the sensing elements with the surface of the workpiece or another surface such that the signaling device is only activated and outputs an alignment signal once all sensing elements come in contact with the respective surface. In the embodiment of the aligning device with three sensing elements, an orthogonal alignment of the aligning device and therefore of the tool can be determined. A simple electric circuit without additional electronic elements can be used in this case.

In a preferred embodiment, the position of an electric switching point of at least one electrical sensing element can be adjusted toward the surface of the workpiece in the supporting direction, particularly screwed or displaced relative to the surface of the workpiece, by means of a contact adjustment screw such that the aligning direction can be adjusted relative to the normal of a workpiece surface. This makes it possible to adjust the switching point, i.e. the relative position between the sensing element and the base body, at which an electrical contact is triggered by the respective sensing element. In this way, an alignment with the normal of the workpiece surface can be very easily adjusted. An alignment along the normal is achieved if the switching point of each sensing element is adjusted identically. A respectively adjustable angular and directional deviation from the normal is achieved by adjusting the switching points differently such that it is also possible to align machining operations that are inclined relative to the workpiece surface. It is therefore not necessary to exert high pressure upon the surface of the workpiece with the aligning device in order to ensure that the device is completely supported. The contact adjustment screw makes it possible to sensitively adjust the switching point in such a way that the signaling device is already activated upon slight contact of the aligning device with the surface of the workpiece. For this purpose, the contact adjustment screw preferably can be displaced and adjusted in a direction extending parallel to the direction of the inserted tool shank.

In a preferred embodiment, at least one spring contact plate, which can be mechanically contacted by at least one electrical sensing element, can be electrically contacted by a screw contact plate with the aid of the contact adjustment screw, wherein the contact adjustment screw is preferably accessible and adjustable from the upper side of the base body and arranged in the base body in the aligning direction, or at least two contact adjustment screws may be electrically connected by means of a common spring contact plate and at least two contact adjustment screws may be electrically connected to one another by means of a screw contact plate. The spring contact plate can deform in such a way that no contact between the spring contact plate and the contact adjustment screw is produced in the initial state whereas the displacement of the sensing elements, which occurs when the tool aligning device is supported on a surface and the sensing elements are in contact with the surface, can cause a deformation of the spring contact plate such that contact between the spring contact plate and the contact adjustment screw is produced. The relative distance of the contact adjustment screw from the spring element defines the position of the switching point. An axial adjustment of the contact adjustment screw by means of a screw-type motion or axial displacement makes it possible to adjust the switching point and therefore the machining direction in a highly precise fashion. In this context, the initial state describes the state prior to the support of the tool aligning device on a surface. Since the contact adjustment screw is accessible and adjustable from the upper side of the base body, an adjustment of the machining direction can already be realized when the sensing elements of the tool aligning device are supported on and pressed against the workpiece surface by adjusting the axial position of the contact adjustment screws without having to remove the tool aligning device from the workpiece. Due to the electrical connection between at least two contact adjustment screws, an electric series connection between the individual contact points, at which the sensing elements produce mechanical contact, can be very easily realized with a minimal number of components in order to thereby achieve a closed electric circuit.

In a preferred embodiment, the at least one spring contact plate may be arranged parallel to the at least one screw contact plate in the base body, wherein the screw contact plate can be electrically contacted by the spring contact plate with the aid of at least one contact adjustment screw due to a spring motion triggered by the sensing element. The spring contact plate and the screw contact plate may therefore be arranged parallel and on top of one another referred to a workpiece surface, wherein the contact adjustment screw is axially aligned in the direction of the workpiece surface in order to thereby adjust the switching point. A current flow takes place via the screw contact plate, the contact adjustment screw and, upon bending the spring contact plate, by the sensing element when the spring contact plate is contacted by the contact adjustment screw. In this way, a mechanically simple and robust design is achieved. The spring contact plate and the screw contact plate may be realized differently or identical in construction. They may likewise consist of the same material. It would also be conceivable to provide multiple spring contact plates and multiple screw contact plates, which may likewise be realized identical in construction. The course of the current flow within the tool aligning device is preferably defined by the geometry of the spring contact plate and the screw contact plate.

In a preferred embodiment, an electrical power source and/or the signaling device may be in electrical contact with at least one spring contact plate and/or at the least one screw contact plate. The signaling device may furthermore be connected to a contact of the power source. The invention therefore proposes a series circuit with minimal electrical wiring and a robust and simple design, as well as a minimal number of electrical connections. Consequently, an alignment signal can simply be activated due to the mechanical contact of all sensing elements with the surface of the workpiece, which causes an electric circuit to be closed by means of the at least one spring contact plate and/or at least one screw contact plate.

In a preferred embodiment, the at least one screw contact plate may feature bores, into which the contact adjustment screw can be inserted, soldered or screwed in order to thereby produce a permanently conductive connection between the screw contact plate and the contact adjustment screw. In this case, the areas, in which mechanical contact between the spring contact plate and the respective contact adjustment screw can be produced due to a motion of the sensing elements, represent the only areas that can cause an interruption or a completion of the electric circuit. Since the screw contact plates are permanently connected to the contact adjustment screws in an electrically conductive fashion, the movable points in the tool aligning device are minimized and the electrical robustness is increased such that the functionality is optimized.

In a preferred embodiment, at least one contact adjustment screw can be secured in its position by means of a locking screw. In this way, the sensitivity of the contact point can be adjusted in a highly precise fashion and an unintentional adjustment of the adjusted alignment can be prevented. If all contact adjustment screws, preferably all three contact adjustment screws, are respectively fixed with a locking screw, the position relative to a normal of the workpiece surface can be adjusted with high precision. The locking screw may radially engage on the contact adjustment screw in order to prevent a change in position. The locking screw may be accessible from the outer circumference of the base body and loosened prior to a change of the alignment by the contact adjustment screw. In this way, bores or countersinks can be produced with a low fault tolerance referred to the aligning direction.

In a preferred embodiment, the at least two sensing elements, preferably at least three sensing elements, may have the same length L. In this way, the number of identical elements is increased and an alignment along the normal of the workpiece surface is simplified. An optical alignment of the bore or the countersink in a workpiece can thereby be achieved. The base body may furthermore be realized circular-cylindrical or partially circular-cylindrical. The minimal distance of the sensing elements from the edge of the base body can be defined with different cross-sectional geometries of the base body. This also defines the minimal distance from a boundary wall or another workpiece element that is arranged at an angle to the surface, on which the tool aligning device with the sensing elements should be placed. Consequently, the distance of a bore, countersink or the like from a boundary wall of the workpiece is thereby also minimized because the base body comes in contact with the boundary wall over a minimal distance. In order to produce a bore or carry out a rotational machining operation in an aligned fashion as close as possible to such a boundary, the base body may be flattened on one side or realized with a special cross-sectional geometry in order to realize an alignment due to its shape, which is realized complementary to surface geometry of the workpiece. The geometry of the base body may also serve for aligning the bore or countersink if the base body contacts a boundary wall or another workpiece element with one or more sides. An adaptation of the base body geometry is particularly advantageous on complex workpiece geometries. The signaling device may furthermore be arranged on the upper side of the base body and realized in the form of an optical, haptical and/or acoustical signal generator, preferably in the form of an LED signal generator. The signaling device is optimally visible for an operator from this side during the operation of the tool. The signaling the device may likewise be arranged on the base body in a lateral position or the corresponding signal may be transmitted to an operator via a connecting cable or in a wireless fashion in case the tool aligning device is not visible for the operator during the operation of the tool. It would therefore be conceivable to also forward an acoustical or optical signal to an operator via an electrical connecting line under difficult acoustical or optical conditions.

The face of the sensing elements touching down on the workpiece surface can preferably feature a ball bearing or roller bearing such that the aligning device can be displaced on the workpiece surface while a predefinable machining angle is maintained. With respect to milling tools, in particular, the partial milling of recesses can be advantageously simplified with a displaceable aligning device.

The invention furthermore concerns a method for producing a countersunk and/or deburred bore with a nominal diameter in a workpiece by utilizing a rotating countersinking tool or a tool arrangement according to one of the above-described embodiments, wherein said method comprises the steps of: producing an unfinished bore in the workpiece and countersinking and/or deburring the unfinished bore by means of the countersinking tool.

It is proposed that the diameter of the unfinished bore is smaller than a maximum diameter of the insertion pin of the countersinking tool, which is defined by a radially outermost section of the reaming edge, such that the unfinished bore can be widened to the nominal diameter by means of the reaming edge arranged on the insertion pin. The reaming edge can preferably produce a bore, the diameter of which corresponds to the diameter of the insertion pin. In this way, the insertion pin can be guided in the bore without play such that an exactly aligned countersink or bevel can be produced on the upper side of the bore with the aid of the countersinking edges.

The diameter of the unfinished bore preferably amounts to at least 80%, particularly at least 90%, of the maximum diameter of the insertion pin. The diameter of the unfinished bore preferably amounts to no more than 99%, particularly no more than 97.5%, especially no more than 95%, of the maximum diameter of the insertion pin. In this way, the reaming edge also acts as a drill bit such that the insertion pin in a manner of speaking widens the bore to the required nominal diameter itself. The reaming edge, which is preferably arranged in the front region of the insertion pin, can produce a progressive cut with chip removal in the direction of the tool tip.

In a preferred variation of the method, the insertion pin may be realized longer than a maximum depth of the unfinished bore, wherein the reaming edge protrudes in a countersinking operation over the bore on an opposite side referred to the countersinking operation, preferably such that it protrudes from the bore over the entire length of the reaming edge. This corresponds to finishing a through-hole or through-bore, which should have a constant diameter over its entire length after the machining with the countersinking tool. This is achieved in that the reaming edge finishes the entire inner surface of the bore to be machined, particularly over the entire length of the bore.

It is likewise conceivable that the machining of a countersink or bevel does not begin until the reaming edge has finished the entire diameter over the entire length of the bore. In other words, a countersink or bevel is only produced once the reaming edge protrudes or projects from the bore on the opposite side and therefore is no longer in contact with the inner surface of the bore.

In a preferred variation of the method, the insertion pin may have a length, over which this insertion pin is in full-surface contact with the inner surface of the bore. During the countersinking operation, the circumference of the entire insertion pin is preferably in contact with the inner surface of the bore. This makes it possible to ensure that the countersinking tool is centered in the bore. It is furthermore preferred that the insertion pin is in contact with the inner surface of the bore at least with its area, which directly borders on the countersinking edge. In this way, the countersinking edge or the countersinking edges can be directly centered.

The embodiments and advantages described above with reference to the countersinking tool and the tool arrangement likewise apply and can be transferred to the method.

FIGURES

Other advantages can be gathered from the present description of the drawings. The drawings show exemplary embodiments of the invention. The drawings, the description and the claims contain numerous characteristics in combination. However, a person skilled in the art will expediently also consider the characteristics individually and integrate these characteristics into other sensible combinations.

In the drawings:

FIG. 7 shows an exterior view of another embodiment of a tool aligning device of an inventive tool arrangement;

FIG. 8 shows a top view of an embodiment of a tool aligning device of the inventive tool arrangement according to FIG. 7 without the cover of the base body;

FIGS. 9A and 9B show a section through an embodiment of an inventive tool and an embodiment of an inventive tool arrangement;

FIG. 10A shows a section through a countersinking tool according to the prior art and according to an inventive embodiment; and FIG. 10B shows a section through a countersinking tool according to an inventive embodiment.

In the figures, similar or identical components are identified by the same reference symbols.

Figure 1A:
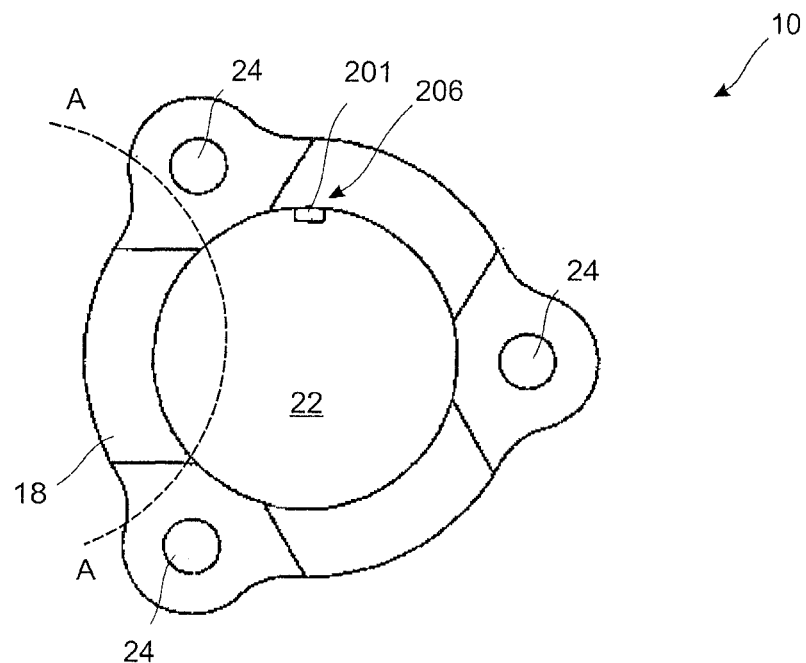
FIGS. 1A and 1B show an embodiment of a tool aligning device of an inventive tool arrangement.

A countersinking tool 210 according to the prior art is initially described below with reference to FIG. 10A.

The countersinking tool 210 illustrated in FIG. 10A is a conical countersinking tool and comprises a partially illustrated tool shank 128 and a tool head 130, which features a rounded insertion pin 266 and a plurality of deburring or countersinking edges 154. The insertion pin 266 of the countersinking tool 210 is accommodated in a bore 182 of a workpiece with play. The bore 182 was provided with a bevel 186 on an upper side of the workpiece by means of the tool head 130 with its deburring or countersinking edges 154. The countersinking tool cannot be held on the longitudinal axis of the bore 182 in a centered fashion due to the clearance or play between the inner surface of the bore 182 and the outer surface of the tool head 130. The bevel 186 to be produced is therefore realized eccentric referred to the rotational axis of the bore 182. In countersinking tools 210 and corresponding methods known from the prior art, the bore 182 already has a nominal diameter, i.e. its final dimensions. A finishing step merely serves for producing the bevel or countersink 186.

FIG. 10B shows an embodiment of an inventive countersinking tool 110, which comprises a tool shank 128, a tool head 130 with multiple deburring or countersinking edges 154 and an insertion pin 166 analogous to the countersinking tool 210 in FIG. 10A. The insertion pin 166 features a reaming edge 168 that is arranged on a radially outer side, wherein two or more reaming edges 168 may also be distributed along the circumference.

The insertion pin 166 is tapered in the direction of its face 170 in a first section, over which the reaming edge 168 extends, and realized cylindrically in a second section that lies between the first section and the tool head 130. The cylindrical section is arranged directly adjacent to the reaming edge 168.

In order to produce a countersunk bore, an unfinished bore 184 illustrated with broken lines is initially produced in the workpiece, wherein the diameter of this unfinished bore is smaller than the nominal diameter of the final bore. During the insertion of the countersinking tool 110 into the unfinished bore 184 to be machined, the first section with the reaming edge 168 is initially introduced into the unfinished bore 184. As the insertion depth increases, the reaming edge 168 comes in contact with the wall of the unfinished bore 184 and removes material therefrom until the bore 182 has reached its nominal diameter, which is defined by the radially outermost section of the reaming edge 168. As the insertion depth increases further, the cylindrical section of the insertion pin 166 is initially introduced into the now widened bore 182 and then guides the countersinking tool 110 therein until the tool head 130 with its deburring or countersinking edges 154 ultimately comes in contact with the workpiece 180 and cuts a bevel 186 into the workpiece 180. In this case, the nominal diameter of the bore 182 preferably corresponds to the diameter of the insertion pin 166. Consequently, the reaming edge 168 preferably does not protrude over the diameter of the insertion pin 166.

According to a variation, an inventive countersinking tool may also be realized in the form of a plane countersinking tool for producing cylindrical countersinks.

Figure 1B:
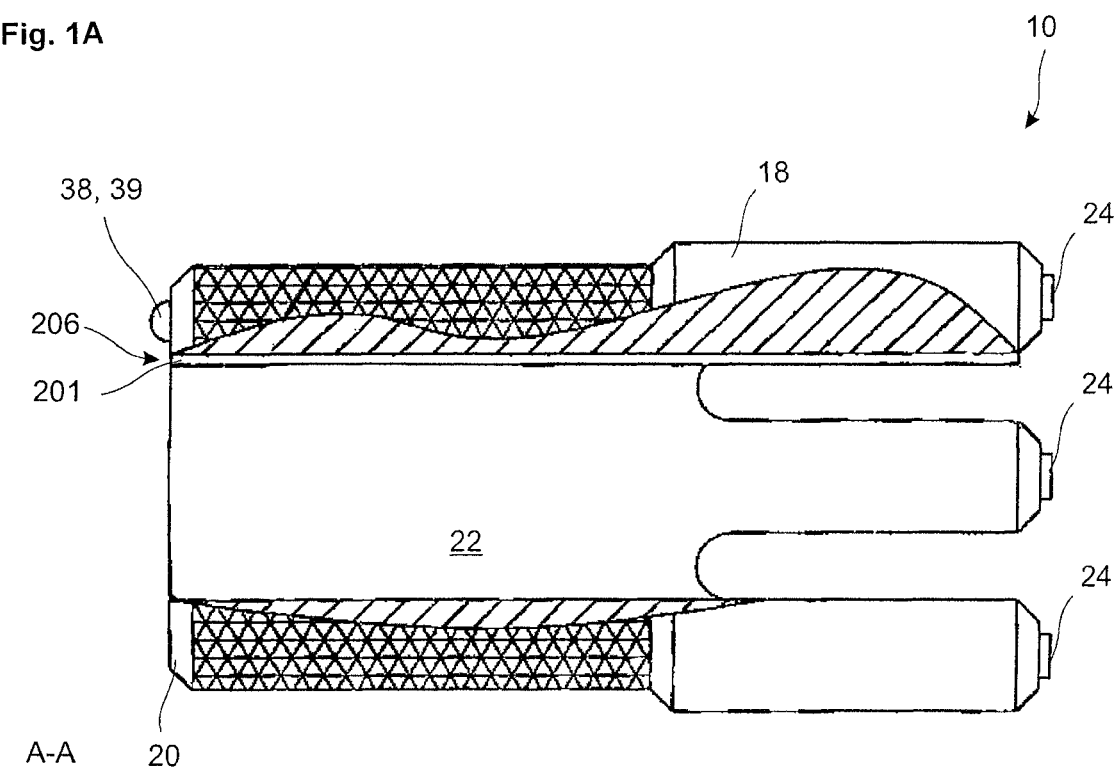

FIGS. 1A and 1B show an embodiment of a tool aligning device 10 for an inventive tool arrangement. The bottom view in FIG. 1A shows the underside of the tool aligning device 10 that faces a workpiece surface. Three sensing elements 24 and a through-hole 22 are visible in this figure. The three sensing elements 24 are equidistantly distributed in the circumferential direction of the base body 18 in order to achieve a stable support and an exact alignment on a plane. A guiding device 206 in the form of a longitudinally/axially aligned web 201 is arranged on the inner side of the base body 18. The through-hole 22 serves for accommodating a clamping tool with a stop and has an inside diameter that corresponds to the outside diameter of the stop.

FIG. 1B shows a longitudinal section through this embodiment along the line of section A-A in FIG. 1A. The three sensing elements 24 protrude from the base body 18 on the underside thereof. The sensing elements 24 respectively extend in a separate elongate section of the base body, wherein the base body does not have a continuous cross section in this area, but is rather realized in the form of a tripod of sorts. A web 201 is arranged along the inner surface of the base body 18. This web extends over the entire length of the base body 18. In an embodiment with a pin, this pin would be realized in the inner side of the base body 18 over a shorter section referred to the length of the base body 18. A cover 20, as well as a signaling device 38 in the form of an LED signal generator 39, is arranged on the upper side of the base body 18. However, an embodiment with more than one signal generator would also be conceivable. The LED signal generator 39 is activated as soon as all three sensing elements 24 are in contact with the workpiece surface and thereby indicates an alignment. The axial position or a protrusion of the sensing elements 24 over the underside of the base body 18 can be adjusted in order to allow an angled alignment relative to the normal of the workpiece surface.

Figure 2A:
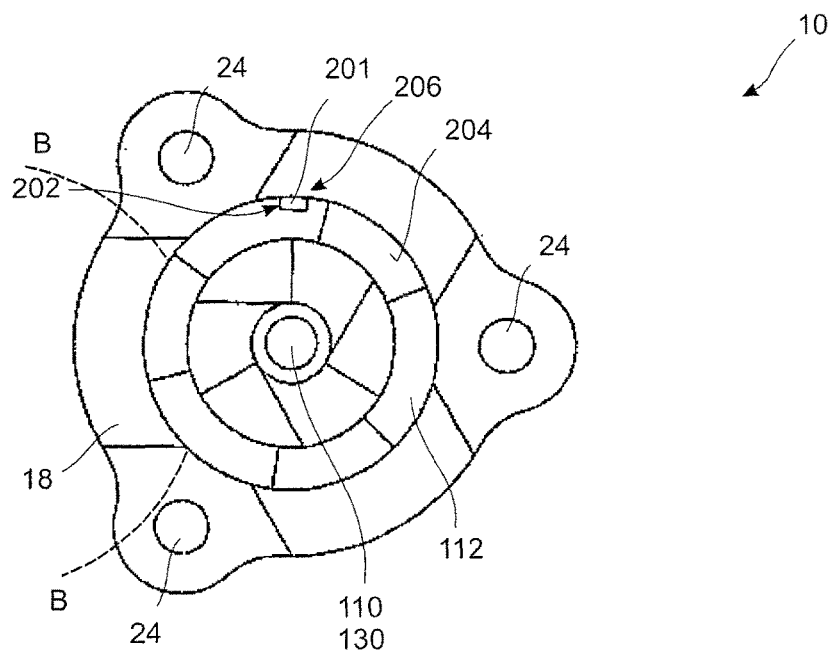
FIGS. 2A and 2B show a tool arrangement with a tool aligning device and a tool.
Figure 2B:
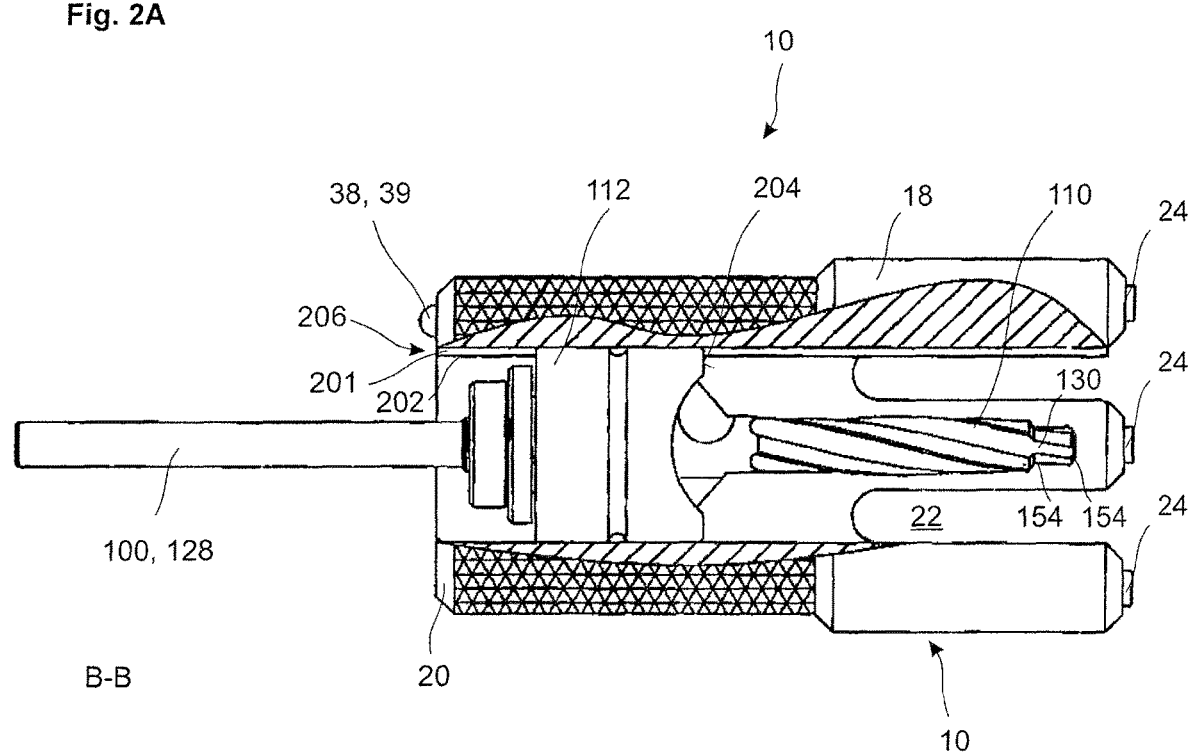

The illustrations in FIG. 2A and FIG. 2B show a tool aligning device 10 with installed stop 112 and a non-inventive tool 310, which can be readily replaced with an inventive countersinking tool 110. The stop 112 is arranged in the interior of the base body 18 and mounted therein in a rotationally rigid and axially displaceable fashion by means of a guiding device 206. For this purpose, the stop 112 features a groove 202, into which the web 201 engages. The illustration in FIG. 2A shows the underside of the tool aligning device 10, wherein the tool head 130 is visible in this illustration.

According to the longitudinal section along the partial lines of section B-B illustrated in FIG. 2B, the stop 112 does not extend over the entire length of the base body 18. The stop 112 can be displaced in the axial/longitudinal direction within the base body 18 until the underside 204 of the stop 112 lies in one plane with the underside of the base body 18 or the sensing elements 24, respectively. The tool shank 128 protrudes over the tool aligning device 10 on the opposite side of the base body 18. In the other embodiments, the tool aligning device 10 corresponds to the tool aligning device in FIG. 1A and FIG. 1B.

Figure 3:
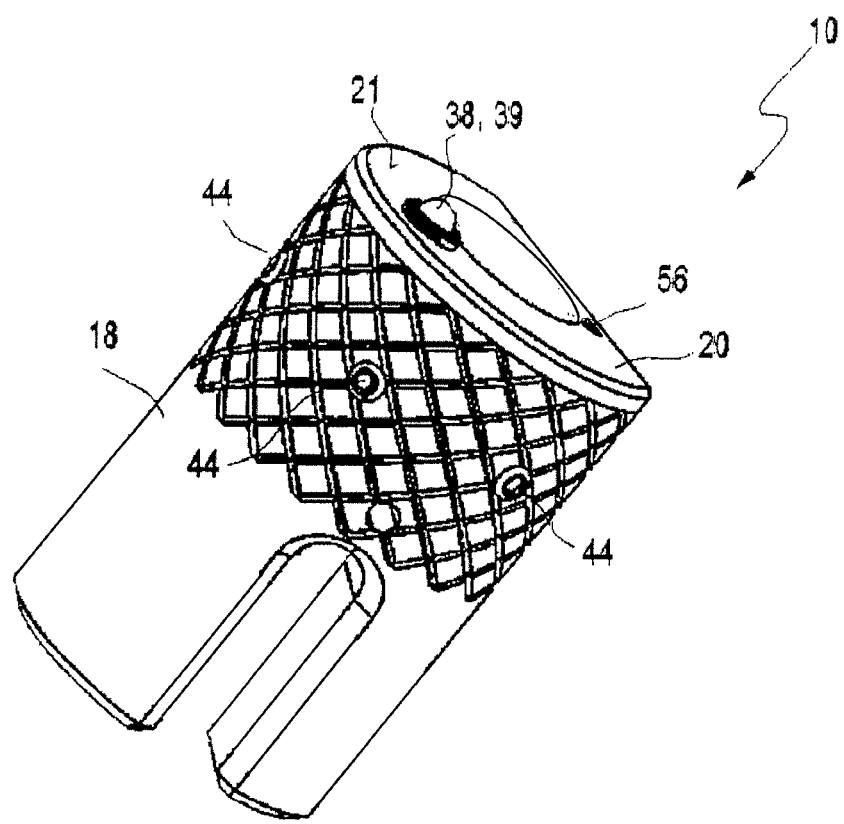
FIG. 3 shows an exterior view of a tool aligning device of an inventive tool arrangement.

FIG. 3 shows a three-dimensional illustration of another embodiment of a tool aligning device 10. The base body 18, the cover 20 of the base body 18, the signaling device 38, the locking screws 44 and a guide sleeve 48 for inserting a (not-shown) tool shank are visible in this exterior view. The base body 18 has a partially circular cross section and is flattened on one side. In this way, the tool aligning device can also be used in corner areas or edge areas of a workpiece with an adjacent wall or step, wherein areas near the adjacent wall can also be machined. The base body 18 features recesses on the side facing the workpiece. This makes it possible to ensure the removal of chips or lubricant during the rotation of an inserted tool. The surface of the base body 18 is realized in a structured fashion in order to simplify the installation on a tool shank 14. The signaling device 38 in the form of an LED signal generator 39 is arranged on the cover 20 and can output an alignment signal. The locking screws 44 serve for fixing the contact adjustment screws (not visible) in order to adjust the sensitivity of the switching point.

Figure 4:
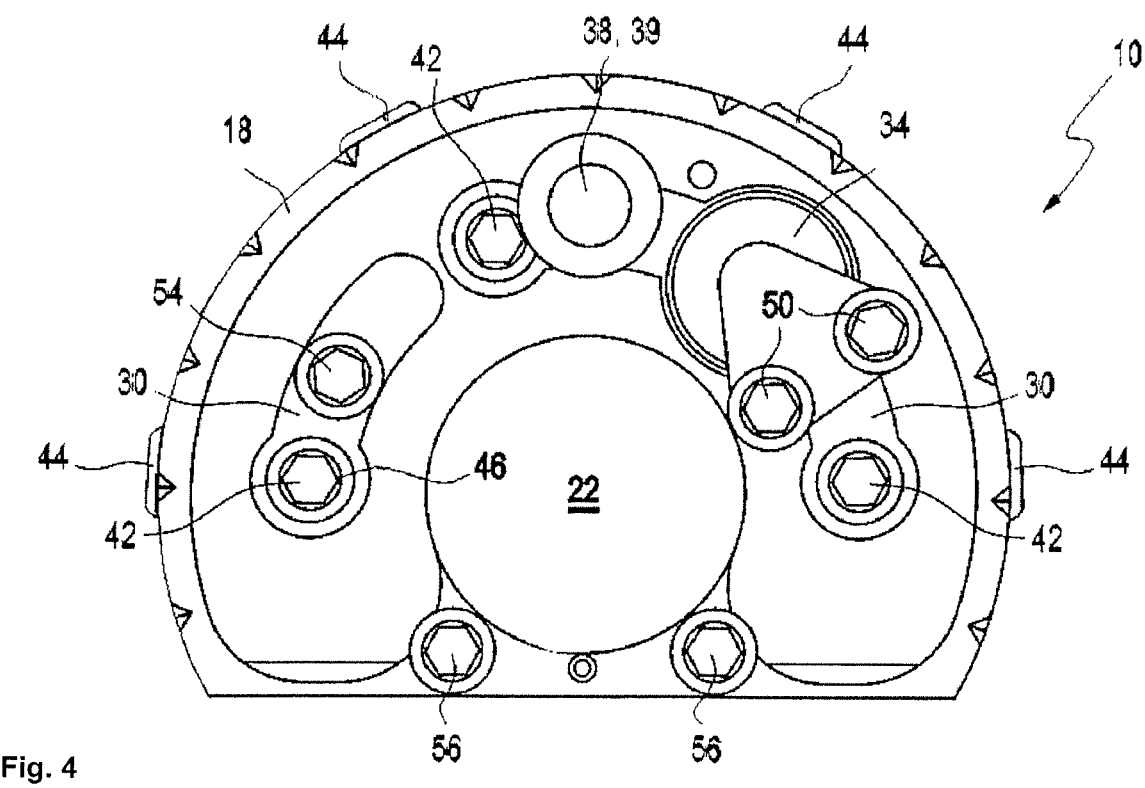
FIG. 4 shows a top view of a tool aligning device of an inventive tool arrangement according to FIG. 3 without the cover of the base body.

FIG. 4 shows a top view of the embodiment according to FIG. 3 without the cover 20 of the base body 18. As a supplement, the fixing screws 56 for the cover 20 and the signaling device 38 are illustrated in this top view. The screw contact plates 30 in the form of a top view, the screw heads of the contact adjustment screws 42 and the screw heads of the fixing screws 54 of the screw contact plates 30 are visible in the interior of the base body 18. The tool aligning device 10 features two separate screw contact plates 30, wherein two contact adjustment screws 42 are arranged in a screw contact plate 30. The electrical power source 34, which is mounted with the fixing screws 50, is also in contact with this screw contact plate 30. Furthermore, the signaling device 38 is contacted by this screw contact plate 30. The locking screws 44, which lock the contact adjustment screws 42 in a certain position, are visible in the form of a side view outside the base body 18. A through-hole 22 for leading through a guide sleeve or for directly inserting a tool is provided in the interior of the base body 18.

Figure 5:
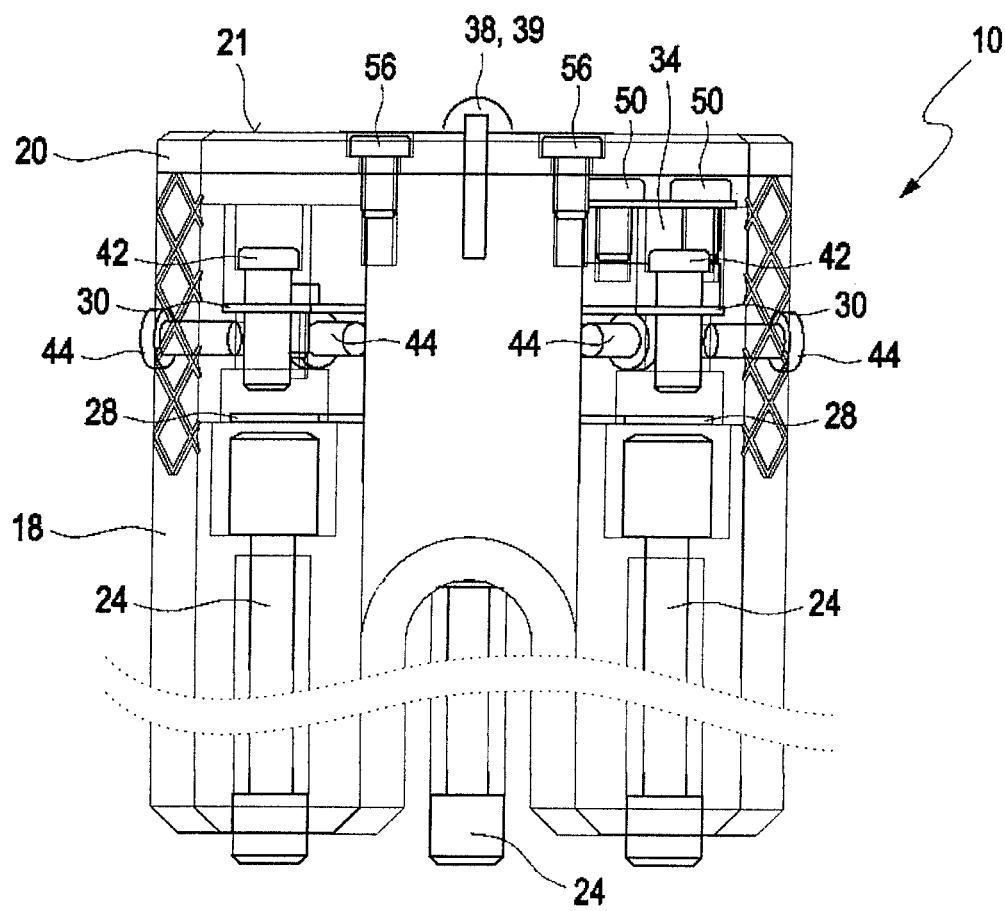
FIG. 5 shows a wireframe representation of a side view of an embodiment according to FIG. 3.

FIG. 5 shows a wireframe representation of an embodiment according to FIG. 3. This figure shows a side view of the tool aligning device 10 from the side of the flattened base body 18, which forms the partial circle. The sensing elements 24 protrude from the base body 18 on the underside thereof, wherein the sensing elements 24 can be vertically displaced toward a workpiece surface such that contact between the sensing elements 24, the spring contact plate 28 and the contact adjustment screw 42 can be produced. The spring contact plates 28 are arranged offset in parallel to the screw contact plates 30, wherein the contact adjustment screws 42 are inserted or screwed into the screw contact plates 30. Contact between the contact adjustment screws 42 and the spring contact plates 28 is produced due to a vertical displacement of the sensing elements 24, wherein the spring contact plates 28 are moved against the contact adjustment screws 42. The electric circuit is closed due to the contact between the (not-shown) workpiece, the sensing elements 24, the spring contact plate 28, the contact adjustment screw 42 and the screw contact plate 30. Consequently, the spring contact plates 28 and the screw contact plates 30 consist of several parts in order to realize a switchable connection between the individual segment sections.

Figure 6:
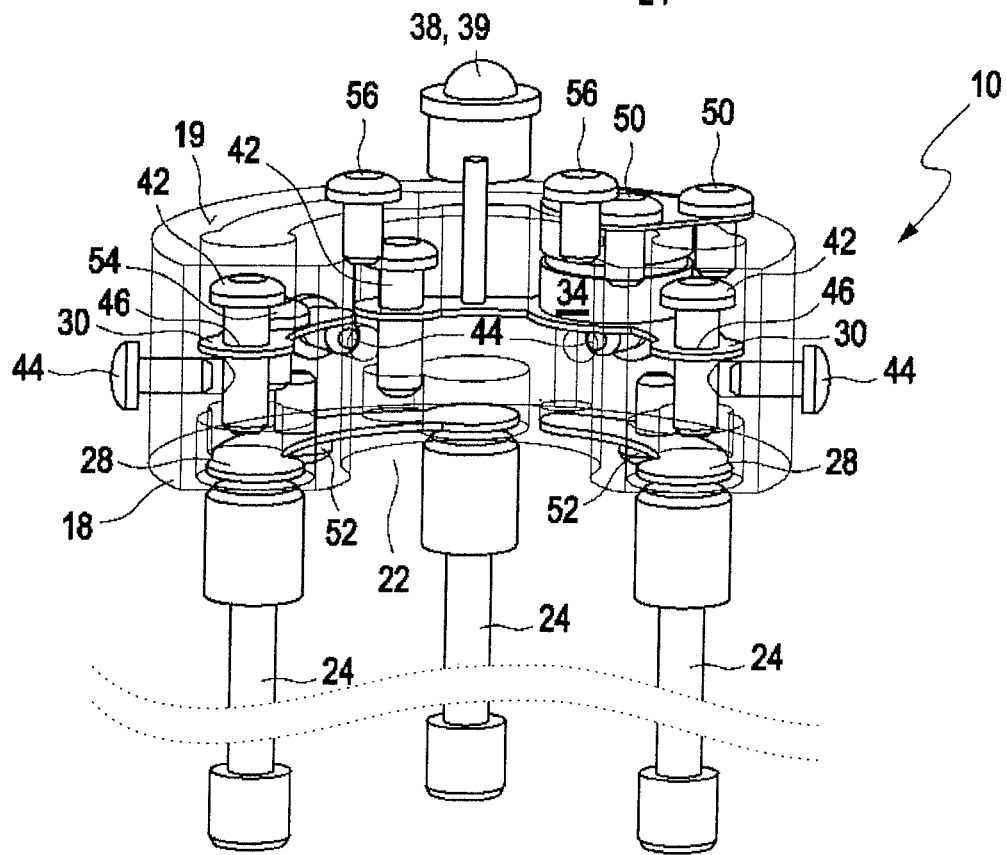
FIG. 6 shows a wireframe representation of a longitudinal section through an embodiment, as well as of a cross section through the base body according to FIG. 3.

FIG. 6 shows a detailed illustration of the internal structure of the tool aligning device 10. The contact adjustment screws 42 are accessible from the upper side through recesses in the interior of the base body 18 and can be inserted into the screw contact plates 30 from this location. The contact adjustment screws 42 can be fixed in a desired vertical position by means of a respectively associated locking screw 44 from the outside of the base body 18 in order to define an aligning direction relative to the normal of a workpiece surface. If all switching points are identical, the machining operation is carried out exactly in the normal. This vertical position defines the sensitivity of the tool aligning device 10, i.e. the switching point, at which the electric circuit 38 is closed. In this way, the tool aligning device 10 can be adapted to a certain contact pressure exerted by an operator. The central sensing element 24 is not arranged in a line of action with the associated contact adjustment screw 42 and the two other sensing elements 24 lie in one plane with the respectively associated contact adjustment screw 42. The signaling device 38 is conductively connected to a screw contact plate 30. The fixing screws 50 of the electrical power source 34, as well as the fixing screws 56 of the (not-shown) cover, are also illustrated in this figure.

FIG. 7 shows another embodiment of a tool aligning device 10. The base body 18 has a circular cross section and therefore is suitable for machining structurally unrestricted workpiece surfaces. In other respects, this illustration corresponds to the illustration in FIG. 3.

FIG. 8 shows a top view of the embodiment according to FIG. 7 without the cover 20 of the base body 18. The base body 18 has a circular cross section, wherein the contact adjustment screws 42 are respectively arranged on one-third of the circumference. The screw contact plates 30 are visible in this illustration whereas the spring contact plates 28 are arranged in a plane, which is offset in parallel underneath the screw contact plates 30 and therefore not visible. A screw contact plate 30 produces a conductive connection between two contact adjustment screws 42, the electrical power source 34 and the signaling device 38. The electrical power source 34 is arranged on the base body 18 by means of the fixing screws 50. The additional screw contact plate 30 is arranged on the base body 18 by means of a fixing screw 54. The locking screws 44 serve for fixing the contact adjustment screws 42 in a desired position.

FIG. 9A shows a tool arrangement with a countersinking tool 110, and FIG. 9B shows a tool arrangement with a stop 112 mounted on the countersinking tool 110. A tool aligning device is not provided and therefore not shown. The countersinking tool 110 illustrated in FIG. 9A corresponds to the countersinking tool 110 in FIG. 10B and comprises a tool shank 128 and a tool head 130, which features an insertion pin 166 that is tapered toward the face 170 and provided with a reaming edge 168, as well as a plurality of deburring or countersinking edges 154.

According to FIG. 9B, the stop 112 comprises a stop sleeve 116, which is mounted such that it is freely rotatable about a shank sleeve 122 by means of two ball bearings 114, 146. The shank sleeve 122 can be axially pushed on the tool shank 128 up to the tool head 130 and non-positively connected to the shank 128 in a rotationally rigid fashion by means of an adhesive connection 138, namely at an axial location of the shank 128 that defines the stop depth. The first bearing bush 118 of the first and the second ball bearing 114, 146 is respectively bonded into the inner wall of the stop sleeve 116. The second bearing bush 120 of the first ball bearing is fixed on the shank sleeve 122 by means of two bearing rings 134 and may likewise be bonded on the shank sleeve 122. The second bearing bush 120 of the second ball bearing 146 is locked by means of a counter bearing ring 124 of the shank sleeve 122 and a bearing ring 134. The stop sleeve 116 can rotate relative to the shank sleeve 122 by means of the two bearings 114, 146. The shank sleeve 122 is non-positively bonded on the shank 128 of the countersinking tool 110, wherein the axial bonding position defines the stop depth of the countersinking tool 110. The countersinking tool 110 illustrated in FIG. 9A and FIG. 9B is suitable for use with a tool aligning device according to one of the above-described embodiments.

In the tool arrangement according to FIG. 9B, no pins, grooves or webs are illustrated on the outer circumference of the stop, but may naturally also be added in order to realize a functional interaction with a guiding device of an aligning device.

LIST OF REFERENCE SYMBOLS

10 Tool aligning device
18 Base body
19 Upper side of base body
20 Cover of base body
21 Upper side of cover
22 Through-hole
24 Sensing element
28 Spring contact plate
30 Screw contact plate
34 Electrical power source
38 Signaling device
39 LED signal generator
42 Contact adjustment screw
44 Locking screw
46 Bore of screw contact plate
50 Fixing screw for battery
52 Fixing screw for first contact plate
54 Fixing screw for second contact plate
56 Fixing screw for cover of base body
110, 210 Countersinking tool
112 Stop
114 Bearing
116 Stop sleeve
118 First bearing bush
120 Second bearing bush
122 Shank sleeve
124 Counter bearing ring
128 Tool shank
130 Tool head
134 Bearing ring
138 Adhesive connection
142 Clamping means
144 Clamping screws
146 Second bearing
152 Engagement recess
154 Edge
156 Stop ring
166, 266 Insertion pin
168 Reaming edge
170 Face
180 Workpiece
182 Bore
184 Unfinished bore
186 Bevel
200 Pin
201 Web
202 Groove
204 Underside of stop
206 Guiding device
310 Tool

The invention claimed is:

1. A countersinking tool, comprising a tool shank and a tool head that features multiple deburring or countersinking edges and an insertion pin, wherein:
the insertion pin features at least one reaming edge, which is arranged on a radially outer side and extends over less than 33% of the overall length of the insertion pin,
an external surface of the insertion pin comprises a first surface region and a second surface region,
the first surface region defines a cylindrical shape, the cylindrical shape has a cylindrical axis that is coaxial with an axis of the countersinking tool, the entirety of the first surface is between a first imaginary plane and a second imaginary plane, the first imaginary plane is perpendicular to the axis of the countersinking tool, the second imaginary plane is perpendicular to the axis of the countersinking tool and is spaced from the first imaginary plane,
an entirety of the second surface region is between the second imaginary plane and a third imaginary plane, the second surface region has diameters, in directions perpendicular to the axis of the countersinking tool, that are smaller at greater distances from the second imaginary plane, the second surface region is curved along a fourth imaginary plane in which an entirety of the axis of the countersinking tool extends,
the at least one reaming edge extends from a first location on the second surface region to a first location of the first surface region, and
the reaming edge can be inserted into an unfinished bore with a diameter, which is smaller than a nominal diameter of the bore, in a cutting fashion, wherein the reaming edge likewise acts as a drill bit and is arranged on the insertion pin at a radius that essentially corresponds to the radius of a nominal diameter of the bore, and wherein the insertion pin has the nominal diameter of the bore and can be guided in the bore without play.

2. The countersinking tool according to claim 1, wherein the reaming edge is arranged in a front region of the insertion pin and/or additional deburring edges, which effect precision machining of a bore to be machined, are arranged on the insertion pin in an offset position in the direction of the tool shank.

3. The countersinking tool according to claim 1, wherein a radius of the cylindrical shape is identical to a radius of the radially outermost section of the reaming edge.

4. A tool arrangement with a countersinking tool according to claim 1 and a stop that is mounted on the tool shank of the countersinking tool, wherein the stop features a stop sleeve, which is coupled to a sliding or rolling bearing such that it is freely rotatable about the countersinking tool.

5. The tool arrangement according to claim 4, wherein a first bearing bush of the bearing carries the stop sleeve and a second bearing bush of the bearing is seated on a shank sleeve in a rotationally rigid fashion, wherein the shank sleeve is mounted on a threadless section of the tool shank of the countersinking tool.

6. The tool arrangement according to claim 4, wherein a tool aligning device for aligning a countersink to be produced or for aligning a finishing step relative to a normal of a surface of a workpiece to be machined is arranged on the stop, wherein the tool aligning device comprises a base body, as well as a through-hole and at least one signaling device, which is activated upon mechanical contact between the tool aligning device and the surface of the workpiece and outputs at least one alignment signal during the alignment in an aligning direction, and wherein the stop is accommodated in the base body.

7. The tool arrangement according to claim 6, wherein the base body comprises a guiding device, which produces a connection between a stop sleeve of the stop and the tool aligning device such that the stop can be aligned in the aligning direction.

8. The tool arrangement according to claim 6, wherein the stop is connected to the tool aligning device in a rotationally rigid fashion.

9. The tool arrangement according to claim 6, wherein the stop is guided in the tool aligning device in a longitudinally displaceable fashion, particularly by means of the guiding device, wherein the stop in the base body can be longitudinally/axially displaced in the direction of the workpiece.

10. The tool arrangement according to claim 9, wherein the guiding device comprises at least one pin, one web and/or one groove, wherein the web and/or the groove preferably extend in the longitudinal direction, parallel to the longitudinal axis of the tool aligning device, and accordingly can be longitudinally/axially guided in a groove or a pin or web of the stop sleeve such that a rotationally rigid connection between the tool aligning device and the stop, as well as an axial displaceability of the stop in the tool aligning device, is achieved.

11. The tool arrangement according to claim 10, wherein the web or the groove extends over the entire axial length of the tool aligning device or the stop, wherein the stop can thereby be displaced in such a way that an underside of the stop can come in mechanical contact with the surface of the workpiece.

12. The tool arrangement according to claim 6, wherein the tool aligning device comprises at least two or mechanical or electrical sensing elements for being supported on the surface of the workpiece, wherein the sensing elements are equidistantly distributed over the circumference of the face of the base body on the workpiece side.

13. The tool arrangement according to claim 12, wherein the axial sensing position of the sensing elements is adjustable.

14. The tool arrangement according to claim 13, wherein a position of an electric switching point of at least one electrical sensing element can be adjusted toward the surface of the workpiece in the supporting direction, particularly screwed or displaced relative to the surface of the workpiece by means of a contact adjustment screw, such that the aligning direction can be adjusted relative to the normal of a workpiece surface.

15. The tool arrangement according to claim 12, wherein an alignment motion of the tool aligning device relative to the normal of the workpiece surface makes it possible for all sensing elements to close an electric circuit between an electrical power source contained in the base body and the signaling device by means of a series circuit activated by the sensing elements in order to thereby activate the individual signaling device.

16. The tool arrangement according to claim 15, wherein the at least two sensing elements have the same length L and/or the base body is realized circular-cylindrical or partially circular-cylindrical and/or that the signaling device is arranged on an upper side of the base body and realized in the form of an optical, haptical and/or acoustical signal generator.

17. The tool arrangement according to claim 12, wherein at least one spring contact plate, which can be mechanically contacted by at least a first electrical sensing element, can be electrically contacted by a screw contact plate with the aid of a contact adjustment screw, wherein the contact adjustment screw is accessible and adjustable from an upper side of the base body and arranged in the base body in the aligning direction, or that at least two contact adjustment screws can be electrically connected by means of a common spring contact plate and at least two contact adjustment screws are electrically connected to one another by a screw contact plate.

18. The tool arrangement according to claim 17, wherein the at least one spring contact plate is arranged parallel to the at least one screw contact plate in the base body, wherein the screw contact plate can be electrically contacted by the spring contact plate with the aid of at least one contact adjustment screw due to a spring motion triggered by the first electrical sensing element.

19. The tool arrangement according to claim 17, wherein an electrical power source and/or the signaling device is in electrical contact with at least one spring contact plate and/or the at least one screw contact plate.

20. The tool arrangement according to claim 17, wherein the at least one screw contact plate features bores, into which the contact adjustment screw can be inserted, soldered or screwed in order to thereby produce a permanently conductive connection between the screw contact plate and the contact adjustment screw.

21. The tool arrangement according to claim 17, wherein at least one contact adjustment screw can be secured in its position by means of a locking screw.

22. A method for producing a countersunk and/or deburred bore with a nominal diameter and an inner surface in a workpiece by utilizing a rotating countersinking tool according to claim 1, wherein said method comprises the steps of: producing an unfinished bore in the workpiece and countersinking and/or deburring the unfinished bore by means of the countersinking tool, wherein the diameter of the unfinished bore is smaller than a maximum diameter of the insertion pin of the countersinking tool, which is defined by a radially outermost section of the reaming edge, such that the unfinished bore is widened to the nominal diameter by means of the reaming edge arranged on the insertion pin.

23. The method according to claim 22, wherein the diameter of the unfinished bore amounts to at least 80%, preferably at least 90%, of the maximum diameter of the insertion pin and/or that the diameter of the unfinished bore amounts to no more than 99%, preferably no more than 97.5%, particularly no more than 95%, of the maximum diameter of the insertion pin.

24. The method according to claim 22, wherein the insertion pin is realized longer than a maximum depth of the unfinished bore, wherein the reaming edge protrudes in a countersinking operation over the bore on an opposite side referred to the countersinking operation, preferably such that it protrudes from the bore over the entire length of the reaming edge.

25. The method according to claim 22, wherein the insertion pin has a length, over which this insertion pin is in full-surface contact with the inner surface of the bore.

26. The countersinking tool according to claim 1, wherein the external surface of the insertion pin further comprises a third surface region, the third surface region is substantially circular and flat, and the third surface region defines a fifth imaginary plane that is perpendicular to the axis of the countersinking tool.

27. The countersinking tool according to claim 26, wherein the insertion pin is in a longitudinal section through the countersinking tool tapered along a curvature line, the curvature of which increases as the distance from the third surface region of the insertion pin decreases.

28. The countersinking tool according to claim 26, wherein the reaming edge is spaced from the third surface region in the axial direction.

* * * * *